United States Patent
Lucà et al.

(10) Patent No.: US 11,724,540 B2
(45) Date of Patent: Aug. 15, 2023

(54) TOOL FOR MOUNTING A MOTOR-VEHICLE WHEEL ON A WHEEL HUB

(71) Applicant: FCA Italy S.p.A., Turin (IT)

(72) Inventors: Stefano Lucà, Turin (IT); Renato Badino, Turin (IT)

(73) Assignee: FCA ITALY S.P.A., Turin (IT)

( * ) Notice: Subject to any disclaimer, the term of this patent is extended or adjusted under 35 U.S.C. 154(b) by 238 days.

(21) Appl. No.: 17/154,422

(22) Filed: Jan. 21, 2021

(65) Prior Publication Data

US 2021/0300113 A1 Sep. 30, 2021

(30) Foreign Application Priority Data

Mar. 26, 2020 (EP) ..................................... 20165839

(51) Int. Cl.
*B60B 29/00* (2006.01)

(52) U.S. Cl.
CPC ........ *B60B 29/001* (2013.01); *B60B 2340/52* (2013.01)

(58) Field of Classification Search
CPC ............ B60B 2310/30; B60B 2310/10; B60B 2340/50; B60B 2340/52; B60B 29/00; B60B 29/001; Y10T 29/538; Y10T 29/53922
See application file for complete search history.

(56) References Cited

U.S. PATENT DOCUMENTS

| 1,624,356 | A | | 4/1927 | Nelson |
| 3,319,327 | A | * | 5/1967 | Dombeck ............. B60B 29/001 29/273 |

FOREIGN PATENT DOCUMENTS

| DE | 3844169 A1 | 12/1988 |
| DE | 10106140 A1 | 2/2001 |
| GB | 2294433 A | 1/1996 |

OTHER PUBLICATIONS

European Search Report dated Nov. 2, 2020.

* cited by examiner

*Primary Examiner* — Tyrone V Hall, Jr.
(74) *Attorney, Agent, or Firm* — Heslin Rothenberg Farley & Mesiti P.C.; Victor A. Cardona, Esq.

(57) ABSTRACT

A tool for mounting a motor-vehicle wheel on a wheel hub includes a tubular body having a coupling portion arranged for coupling to the wheel hub, and a carrier portion for supporting the motor-vehicle wheel during a centering phase of the wheel on the hub. The tool has an inner tubular member and an outer tubular member rigidly connected to each other so as to be coaxial. At the coupling portion, the inner and outer tubular members are spaced apart so as to define a space arranged to receive an end portion of the wheel hub, in such a way that, in an operating condition, the end portion of the hub is interposed between the inner tubular member and the outer tubular member.

9 Claims, 4 Drawing Sheets

TOOL FOR MOUNTING A MOTOR-VEHICLE WHEEL ON A WHEEL HUB

CROSS REFERENCE TO RELATED APPLICATIONS

Figure 1:
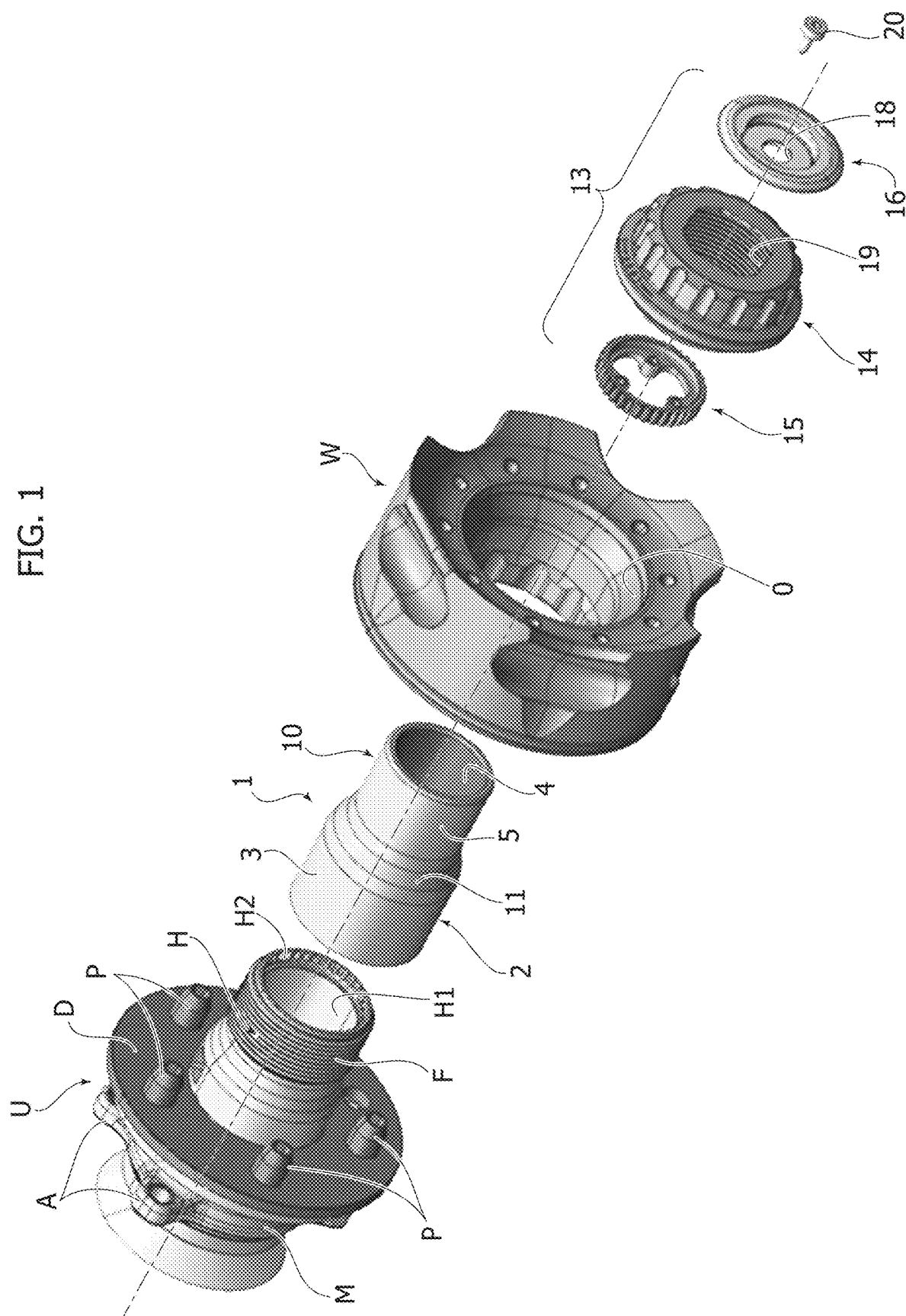

This application claims priority from European Patent Application No. 20165839.0 filed on Mar. 26, 2020, the entire disclosure of which is incorporated herein by reference.

FIELD OF THE INVENTION

The present invention relates to a tool for mounting a motor-vehicle wheel on a wheel hub, having a coupling portion arranged for coupling to the wheel hub and a carrier portion for supporting the motor-vehicle wheel during a wheel centering phase on the hub.

PRIOR ART

In the field of sports cars, the use of fastening and unscrewing systems of the single-nut type to fasten the wheels to the respective wheel hubs is widespread, as these systems allow significant reduction of the time required to change one or more wheels, compared to traditional fastening systems. In order to further reduce the complexity of the mounting operations of the wheels to the respective hubs, aid devices have already been proposed in the past to facilitate these mounting operations.

However, there is a need to further simplify the mounting operations indicated above, to allow the user to proceed with the mounting of the wheels to the respective hubs without difficulty and with extremely reduced times.

OBJECT OF THE INVENTION

The object of the present invention is that of producing a tool of the type indicated above that satisfies the above requirements.

A further object of the invention is to provide a tool which lends itself to being easily implemented, in order to simplify the mounting operations of the wheels of a motor-vehicle on the respective wheel hubs.

An additional object of the invention is to provide a simple, low-cost tool that is uniquely usable for wheels and hubs arranged on both sides of a motor-vehicle.

SUMMARY OF THE INVENTION

In view of achieving these objects, the invention relates to a tool for mounting a motor-vehicle wheel on a wheel hub, having a tubular body defining a coupling portion arranged for coupling to the wheel hub, and a carrier portion for supporting the motor-vehicle wheel during a centering phase of the wheel on the hub, said tool comprising:
an inner tubular member defined by a first circumferential wall and an outer tubular element defined by a second circumferential wall, wherein said inner and outer tubular members are rigidly connected to each other so as to be coaxial,
wherein said inner tubular member is sized to be axially mounted within the hub, and said outer tubular member creates said carrier portion to support the motor-vehicle wheel during a centering phase of the wheel on the hub,
wherein, at said coupling portion, said inner and outer tubular members are spaced apart so as to define a space arranged to receive an end portion of the wheel hub, in such a way that, in an operating condition, said terminal portion of the hub is interposed between said inner tubular member and said outer tubular member.

According to a further characteristic of the invention, the inner tubular member comprises at least one reference element designed to ensure correct mounting of the tool on the wheel hub.

Preferably, said at least one reference element is a radially protruding annular rib, arranged to strike against an end edge of the wheel hub, when the tool is axially coupled to the wheel hub.

According to an additional characteristic of the invention, the outer tubular member has a tapered portion, in such a way that at a gripping portion opposite the coupling portion, the circumferential walls of the inner and outer tubular members are substantially adjacent.

The present invention also relates to a method for mounting a motor-vehicle wheel on a wheel hub comprising the following steps:
arranging a wheel support assembly comprising a wheel disc, a wheel hub and a series of centering members protruding from the wheel disc,
preparing a tool having the characteristics indicated above,
inserting said tool on the wheel hub in an axial direction, so that the inner tubular member is arranged within the circumferential wall of the hub, and the circumferential wall of the hub is interposed between said inner tubular member and said outer tubular member,
pushing said tool along an axial direction, until it reaches a stably coupled condition of the tool on the wheel hub,
arranging the wheel on the hub, so that the wheel axis coincides with the hub axis,
centering the wheel with respect to the centering devices, with the aid of said tool, so as to easily define the angular position of the wheel on the wheel hub,
removing the tool from the wheel hub, and
applying a locking and anti-unscrewing element to lock the wheel on the wheel hub.

DESCRIPTION OF A PREFERRED EMBODIMENT

Figure 2:
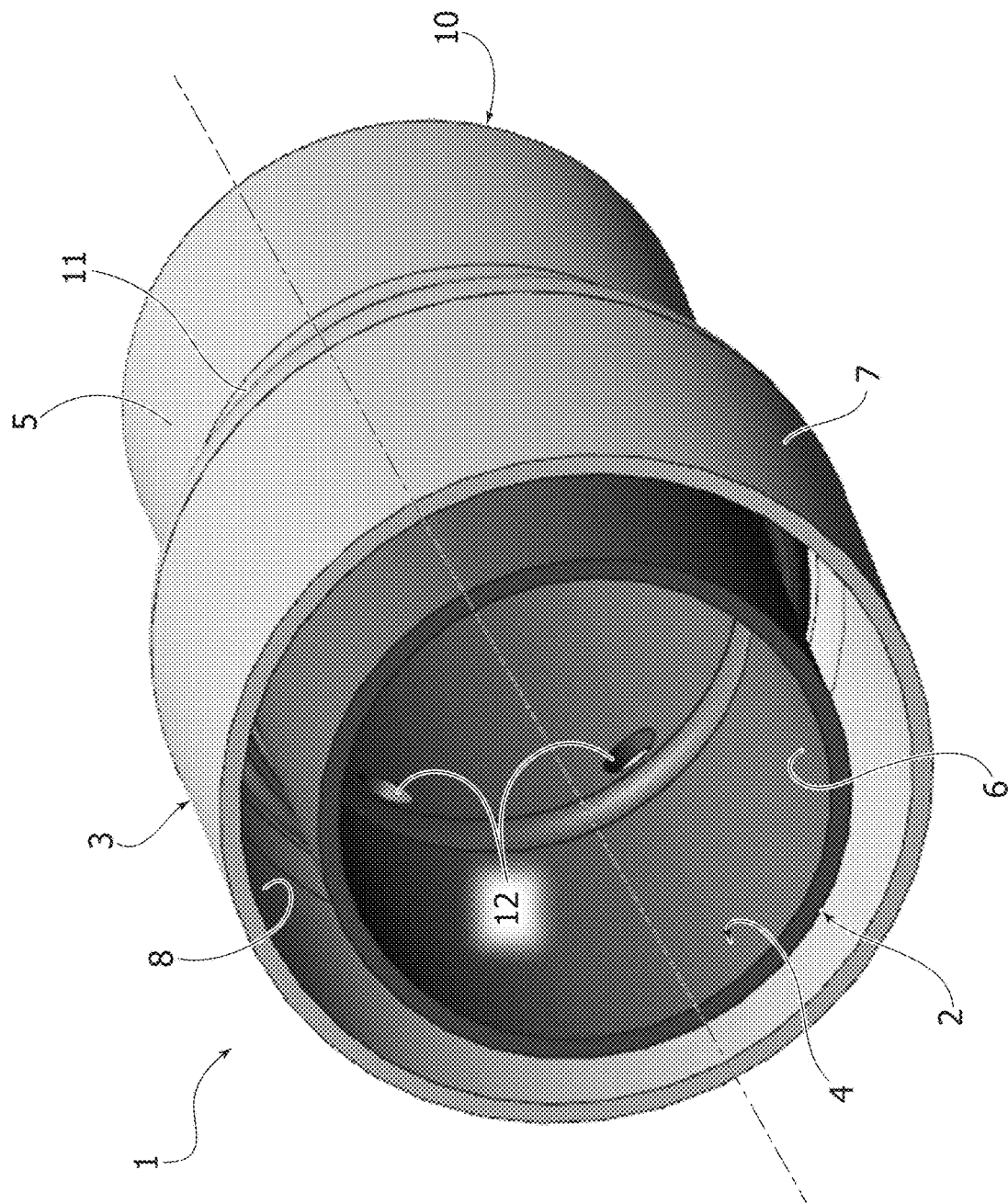
Figure 3:
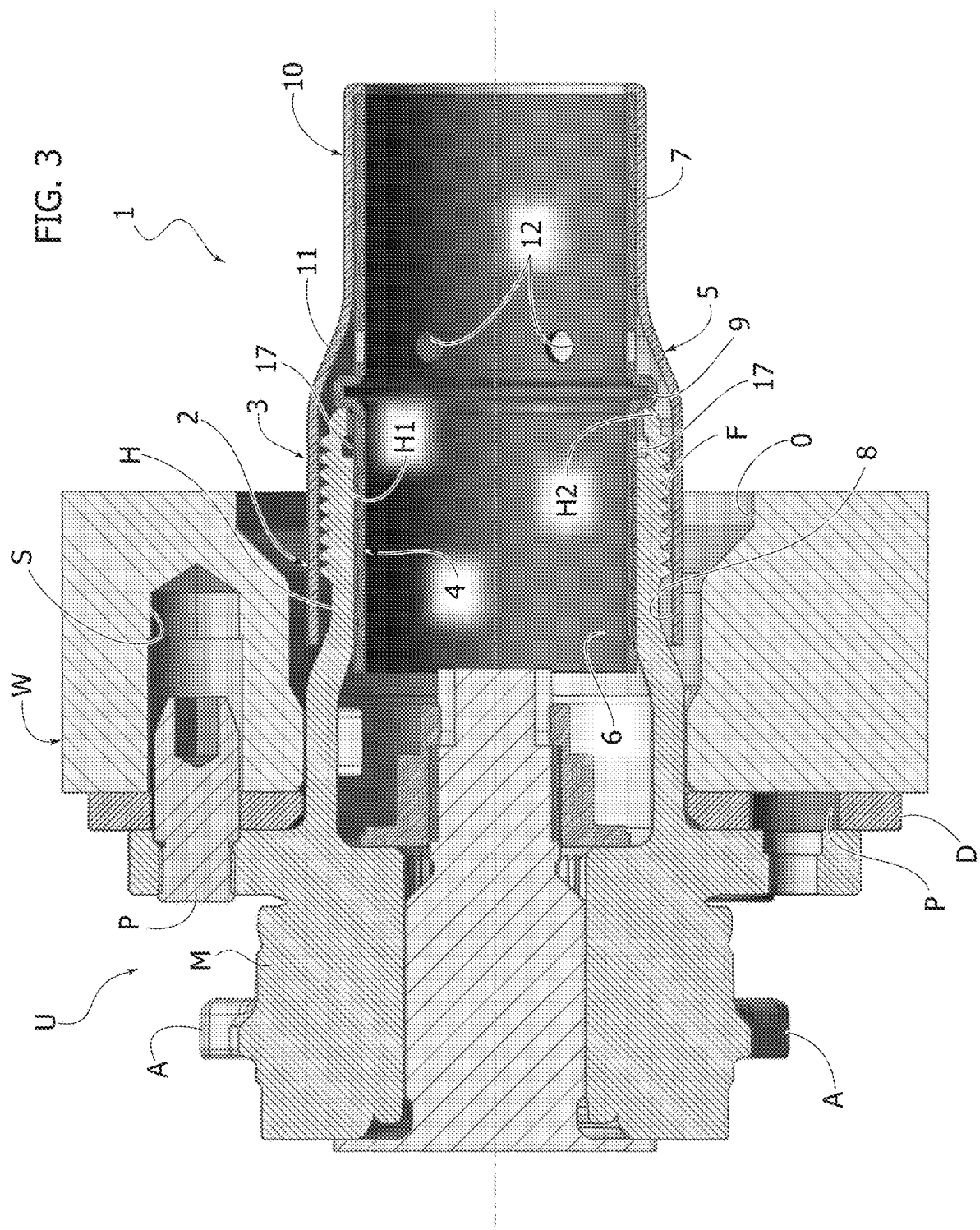
Figure 4:
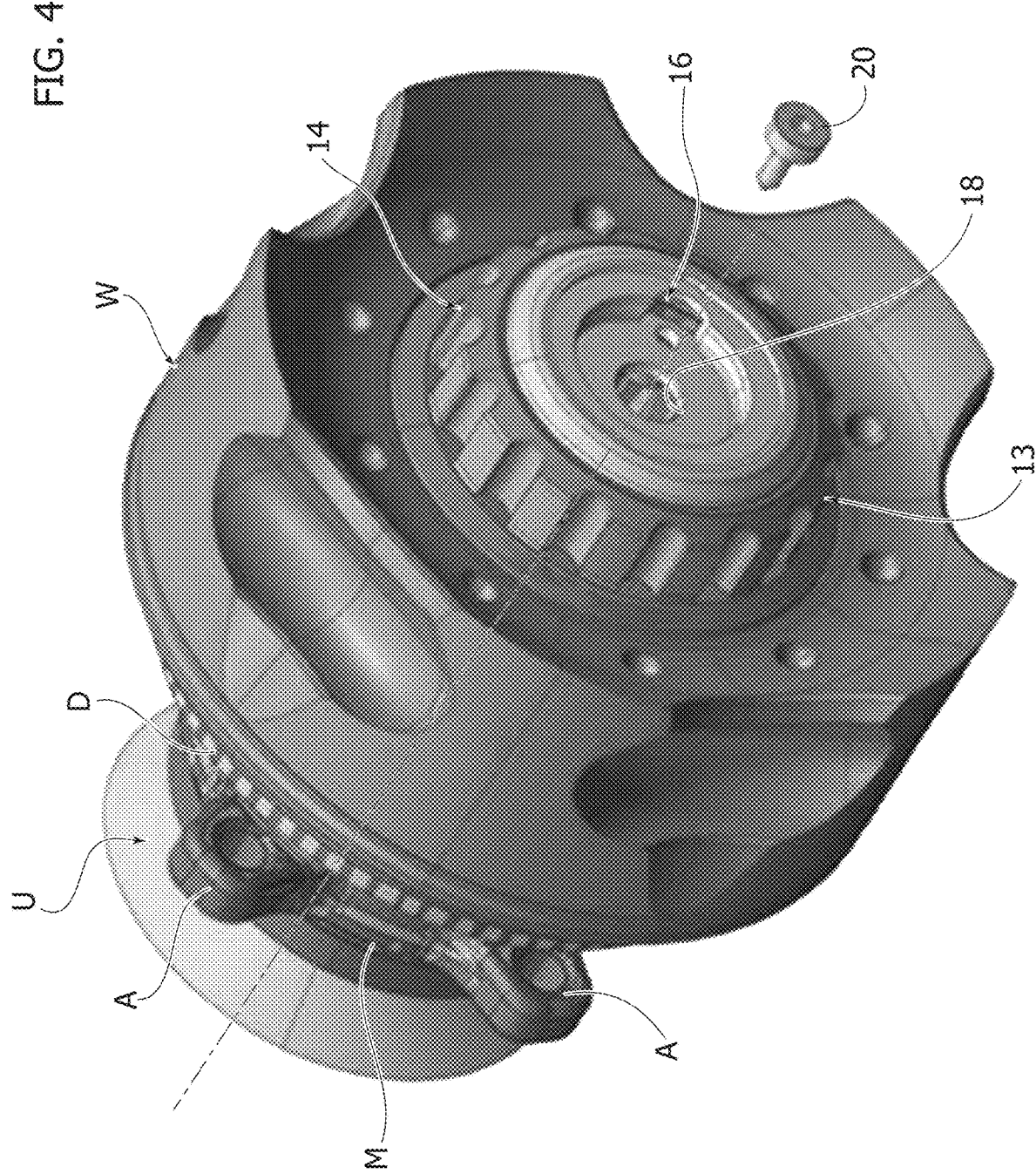

Further characteristics and advantages of the invention will become apparent from the description that follows with reference to the attached drawings, provided purely by way of non-limiting example, wherein:

FIG. 1 is an exploded perspective view illustrating a motor-vehicle wheel assembly including the tool according to the present invention, FIG. 2 is a perspective view that illustrates the tool according to a preferred embodiment, FIG. 3 is a cross-sectional view illustrating the tool of the previous Figure associated with a wheel hub, and FIG. 4 is a perspective view of the wheel assembly illustrated in FIG. 2, in its final assembled condition.

In the following description, various specific details are illustrated aimed at a thorough understanding of examples of one or more embodiments. The embodiments can be implemented without one or more of the specific details, or with other methods, components, materials, etc. In other cases, known structures, materials, or operations are not shown or described in detail to avoid obscuring various aspects of the embodiments. The reference to "an embodiment" in the context of this description indicates that a particular configuration, structure or characteristic described in relation to the embodiment is included in at least one embodiment. Therefore, phrases such as "in an embodiment", possibly present in different places of this description do not necessarily refer to the same embodiment. Moreover, particular conformations, structures or characteristics can be combined in a suitable manner in one or more embodiments and/or associated with the embodiments in a different way from that illustrated here, for example, a characteristic here exemplified in relation to a figure may be applied to one or more embodiments exemplified in a different figure.

The references illustrated here are only for convenience and do not therefore delimit the field of protection or the scope of the embodiments.

It should be noted that the conformation of the tool exemplified in the figures should not be considered in any way limiting, but simply representative of one of the multiple embodiments of the tool incorporating unique characteristics of the invention.

In the attached drawings, reference 1 indicates—in general—a preferred embodiment of a tool for mounting a motor-vehicle wheel on a wheel hub according to the present invention. As illustrated in particular in the perspective view of FIG. 2, the tool 1 has a tubular-shaped body defining a coupling portion 2 arranged for coupling to a wheel hub H, and a carrier portion 3 arranged to support a motor-vehicle wheel W during a centering phase of the wheel W on the hub H. In the present description, the term "centering" means the angular positioning of the wheel W with respect to the hub H.

FIG. 1 is an exploded perspective view of a motor-vehicle wheel assembly associated with a tool 1 according to the invention. In FIG. 1—according to a technique known per se—shows a wheel hub structure U and a motor-vehicle wheel W arranged to be connected to the structure U. The construction details relating to the tire of the wheel W are not presented here, since these details can be made in any known way and, also, since elimination of these details from the drawings makes the latter more readily and easily understood.

The hub structure U comprises:
 a wheel upright M provided with a plurality of attachment points A for connecting to one or more members of a motor-vehicle suspension (not illustrated in the drawings),
 a wheel disc D arranged to cooperate with at least one braking member (for example, a brake caliper), and
 a wheel hub H projecting from the wheel disc D in an axial direction.

The reference P indicates a circumferential series of centering members, arranged protruding from the wheel disc D parallel to the main axis of the hub H, and arranged to define the angular position of the wheel W with respect to the hub H. The wheel hub H comprises an end thread F arranged for reciprocal coupling with a locking and anti-unscrewing element 13 of the wheel W, to lock the wheel W to the structure U. The features relating to this locking element 13 are indicated in greater detail below in the present description.

Still with reference to the exploded view of FIG. 1, a preferred embodiment of the tool 1 according to the present invention is shown alongside the hub H. As will be illustrated in greater detail in the description that follows, the tool 1 is designed to be coupled to the wheel hub H during an mounting step of the wheel W on the hub H, so as to facilitate execution of these mounting operations, in particular during angular positioning of the wheel, in alignment with the centering elements P.

As indicated above, the tool 1 has a tubular-shaped body defining a coupling portion 2 arranged for coupling to a wheel hub H, and a carrier portion 3 to support the wheel W during a centering phase of the wheel W on the hub H. With reference, in particular, to the perspective view of FIG. 2, the tool 1 comprises an inner tubular member 4 defined by a first circumferential wall 6 and an outer tubular member 5 defined by a second circumferential wall 7. The inner and outer tubular members 4, 5 are rigidly connected to each other so as to be coaxial.

The inner tubular element 4 is sized to be mounted axially within the wall H1 defining the hub H, while the outer tubular member 5 is arranged to create the aforesaid carrier portion 3 to support the motor-vehicle wheel W during mounting of the wheel W on the hub H.

FIG. 3 is a cross-sectional view showing the wheel assembly in the assembled condition, with the tool 1 coupled to the hub H. Note that, at the coupling portion 2, the inner and outer tubular members 4, 5 are spaced apart from each other, so as to define a space 8 between the respective circumferential walls 6, 7. The space 8 is sized to receive an end portion of the wheel hub H, in such a way that the circumferential wall H1 of the hub H is interposed between the inner tubular member 4 and the outer tubular member 5. It will therefore be appreciated that in the coupled condition of the tool 1 to the hub H, at the coupling portion 2 of the tool 1, the inner tubular member 4 is arranged inside the wheel hub H, and the outer tubular member 5 is arranged above the wheel hub H so as to cover its circumferential wall H1 and the thread F. At the coupling portion 2, the diameters of the inner and outer tubular members 4 and 5 are sized to create a hub H/tool 1 coupling, so as to guarantee both centering and easy removal of the tool 1 once the mounting operation is complete. Since the tool 1 has a maximum diameter slightly greater than the diameter of the hub H in the area of the thread F, it is possible to easily insert the wheel W on the hub associated with the tool 1, making the tool 1 pass through the central opening O of the wheel W.

According to a further characteristic of the invention, the inner tubular member 4 comprises one or more reference elements arranged to ensure correct mounting of the tool 1 on the wheel hub H, before proceeding with the mounting of the wheel W. With reference to the specific embodiment illustrated in the drawings, these reference elements are made at the inner tubular member 4, in the form of a circumferential rib 9 protruding from the first circumferential wall 6. The rib 9 is arranged near the center line of the longitudinal extension of the tool 1, and is arranged to come into contact against the end edge H2 of the wheel hub H, when the tool 1 is coupled to the wheel hub H. Thanks to this characteristic, it is possible to minimize the possibility of malfunctions due to incorrect positioning of the tool 1, along the axis of the hub H.

Thanks to the particular configuration of the previously described tool 1, in the mounted condition of the tool 1 on the hub H, the tubular body of the tool 1 protrudes axially from the hub H, creating a support to allow the support of the wheel W during mounting operations of the wheel W, in particular during the centering phase of the wheel W with respect to the centering members P. It will therefore be appreciated that the user engaged in the mounting of the wheel W can avoid having to support the wheel W with his own strength during the operations of wheel/hub centering. At the same time, as the thread F of the hub H is covered by the outer tubular member 5, the use of the tool 1 allows avoiding any type of damage to the wheel W deriving from the contact of the wheel W (for example, made of aluminum) and the hub H (for example made of steel). Preferably, the tool 1 is made of aluminum, so as to be particularly resistant to wear. A further advantage deriving from the tool 1/hub H coupling methods described above, is that of being able to create a single tool that can be used univocally for wheels and hubs arranged on both sides of a motor-vehicle With reference in particular to FIGS. 2 and 3, the tool 1 comprises a gripping portion 10 opposite to the coupling portion 2, arranged for gripping by an operator during the maneuvering steps of the tool 1 to couple/uncouple the tool 1 and the hub H. The gripping portion 10 also creates the first centering point of the wheel W during mounting. During use, the user must slide the wheel W over the area 10, up to the carrier portion 3 to carry out the mounting operations. The gripping portion 10 has a smaller diameter than that of the coupling portion 2. This geometry variation between the coupling portion 2 and the gripping portion 10 is achieved by means of a tapered wall 11 made on the outer tubular member 5. The tapered wall 11 is arranged near the rib 9 of the inner tubular member 4. In greater detail, it should be noted that the inner tubular member 4 has a constant diameter, with the exception of the circumferential wall portion 6, in which the protruding rib 9 is made, while the outer tubular member 5 has a variable diameter along its longitudinal extension. At the gripping portion 10, the diameters of the inner and outer tubular members 4, 5 are substantially coincident, in such a way that the respective circumferential walls 6, 7 of the elements 4, 5 are substantially adjacent, so as to allow the connection between the inner tubular member 4 and the outer tubular member 5. Preferably, the two tubular members 4 and 5 are connected to each other by interference, at the inner part of the portion 10.

According to a preferred characteristic of the invention, the inner tubular member 4 has a series of holes 12 arranged according to a circumferential series near the rib 9. Since the stroke-end reference 9 (made by the rib in the embodiment illustrated in the drawings) constitutes an obstruction to the possible passage of water, in the event that the tool 1 is used with adverse weather conditions, these holes 12 allow draining of the water, and thus prevent corrosion phenomena of the tool 1. In light of the structural characteristics of the tool 1 described above, the mounting sequence of the motor-vehicle wheel W on the wheel hub H will now described, in accordance with the components illustrated in FIG. 1.

In order to facilitate the mounting step of the motor-vehicle wheel W on the assembly including the hub H, the tool 1 must be coupled to the wheel hub H, inserting the tool 1 on the hub H along an axial direction. At the coupling portion 2, the inner tubular member 4 is arranged within the hub H, and the circumferential wall H1 of the hub H is interposed between the inner tubular member 4 and the outer tubular member 5. The latter is therefore arranged outside the hub H, so as to cover the thread H1 of the hub H.

To ensure the correct coupling of the tool 1 with the hub H, it is necessary to push the tool 1 along an axial direction, until reaching a stably coupled condition of the tool 1 on the wheel hub H. Preferably, this condition is achieved by the contact between the protruding rib 9 of the inner tubular member 4 and the end edge H2 of the hub H.

Once the correct coupling condition between the tool 1 and the hub H is reached, it is possible to insert the wheel W onto the hub H, so that the wheel axis coincides with the axis of the hub H. To carry out the centering phase of the wheel H with respect to the centering devices P of the unit U, it is possible to use the support created by the tool 1. Thanks to the covering of the thread F made by the wall 7 of the outer tubular member 5, it is possible to avoid any damage to the thread F by contact between the wheel W and the hub H. By using the carrier portion 3 of the tool 1, it is possible to easily define the angular position of the wheel W on the wheel hub H. According to a technique known per se, to define the angular position of the wheel W on the hub H, the pins P must be mutually coupled with respective seats S (shown in FIG. 3) obtained on the structure of the wheel W.

Once the angular position of the wheel W has been defined, it is possible to remove the tool 1 from the hub H by applying a traction force in the opposite direction to the hub H. At this point, it is possible to apply the locking and anti-unscrewing elements 13 to lock the wheel W onto the wheel hub H.

With reference to the embodiment illustrated in the drawings, the locking element 13 is a single-nut type member, configured to be screwed onto the thread F of the hub H and to lock the wheel W onto the unit U. Observing the exploded view of FIG. 1, it should be noted that the element 13 comprises a coupling nut 14 arranged to be screwed onto the thread F of the hub H. The element 13 also comprises a ring nut 15 coupled by means of fastening means 20 to a washer 16. The washer 16 has a body shaped to be arranged within a corresponding shaped seat 19 of the nut 14. In the illustrated example, the aforesaid fastening means are made from at least one fastening screw (e.g. made of titanium).

In the final assembled condition of the wheel W at the hub H, the nut 13 is screwed onto the thread F of the hub H, and the ring nut 14 is arranged within a grooved portion 17 obtained on the inner surface of the wall H1 of the hub H. The washer 16 has a central hole 18 made to allow drainage of any water infiltrations inside the mounted wheel assembly.

Thanks to the above characteristics, the tool 1 according to the invention offers the following advantages:
   reduction of the complexity of the wheel mounting operations on the respective hubs,
   allowing a user to proceed with the mounting of the wheels without difficulty and with extremely rapid times;
   cancelling the possibility of damage to the thread F deriving from contact with the wheel (for example, made of aluminum) and the hub (for example, made of steel); and
   preparing a tool that is constructively simple, with low production costs, and uniquely usable for wheels and hubs arranged on both sides of a motor-vehicle.

Of course, without prejudice to the principle of the invention, the details of construction and the embodiments may vary widely with respect to those described and illustrated purely by way of example, without departing from the scope of the present invention.

What is claimed is:

1. A tool for mounting a motor-vehicle wheel on a wheel hub, having a tubular body defining a coupling portion arranged for coupling to the wheel hub, and a carrier portion for supporting the motor-vehicle wheel during a centering phase of the wheel on the hub, said tool comprising:
   an inner tubular member defined by a first circumferential wall and an outer tubular member defined by a second circumferential wall, wherein said inner and outer tubular members are rigidly connected to each other so as to be coaxial,
   wherein said inner tubular member is sized to be mounted axially within the hub, and said outer tubular member provides said carrier portion to support the motor-vehicle wheel during a centering phase of the wheel on the hub, wherein, at said coupling portion, said inner and outer tubular members are spaced apart so as to define a space arranged to receive an end portion of the wheel hub, in such a way that, in an operating condition, said end portion of the wheel hub, is interposed between said inner tubular member and said outer tubular member.

2. A tool according to claim 1, wherein said inner tubular member comprises at least one reference element arranged to ensure correct mounting of the tool on the wheel hub.

3. A tool according to claim 2, wherein said at least one reference element is a radially protruding annular rib, arranged to strike against an end edge of the wheel hub, when the tool is axially coupled to the wheel hub.

4. A tool according to claim 1, wherein said tubular body comprises a gripping portion opposite to said coupling portion and in that, at said gripping portion, said outer tubular member has a smaller diameter than that at the coupling portion.

5. A tool according to claim 4, wherein said outer tubular member has a tapered portion in such a way that at said gripping portion said first and second circumferential walls are substantially adjacent.

6. A tool according to claim 1, wherein said inner tubular member comprises a series of holes arranged to allow any water infiltrations to drain, and thus prevent corrosion phenomena of the tool.

7. A method for coupling a motor-vehicle wheel to a wheel hub comprising the following steps:

arranging a wheel support assembly comprising a wheel disc, a wheel hub, and a series of centering members protruding from the wheel disc, arranging a tool according to claim 1, inserting said tool onto the wheel hub in an axial direction, so that the inner tubular member is arranged within the circumferential wall of the hub, and the circumferential wall of the hub is interposed between said inner tubular member and said outer tubular member, pushing said tool along an axial direction, until said tool reaches a stably coupled condition of the tool on the wheel hub, arranging the wheel on the hub, so that the wheel axis coincides with the hub axis, centering the wheel with respect to the centering devices, with the aid of said tool, so as to easily define the angular position of the wheel on the wheel hub, removing the tool from the wheel hub, and applying a locking and anti-unscrewing element to lock the wheel on the wheel hub.

8. A method according to claim 7, wherein the step of pushing said tool along an axial direction, until reaching a stably coupled condition of the tool on the hub, comprises making contact between a protruding annular rib of the inner tubular member and the end edge of the wheel hub.

9. A method according to claim 7, wherein the step of applying a locking and anti-unscrewing element is carried out by means of a single nut-type locking element comprising a ring nut, configured to be arranged within a groove formed on a portion of the inner surface of the hub.

* * * * *